United States Patent [19]
Janke et al.

[11] Patent Number: 5,635,101
[45] Date of Patent: Jun. 3, 1997

[54] DEICING COMPOSITION AND METHOD

[76] Inventors: George A. Janke, 5600 N. Poinsettia, #1507, West Palm Beach, Fla. 33407; Warren D. Johnson, Jr., 511 SW. Bay Pointe Cir., Palm City, Fla. 34990

[21] Appl. No.: 589,497

[22] Filed: Jan. 22, 1996

[51] Int. Cl.$^6$ ............... C09K 3/18; C09K 3/00
[52] U.S. Cl. ............ 252/70; 106/13; 106/14.11; 106/14.14; 106/14.44
[58] Field of Search ............... 106/13, 14.11, 106/14.44, 14.14; 252/70

[56] References Cited

U.S. PATENT DOCUMENTS

| | | | |
|---|---|---|---|
| 4,106,487 | 8/1978 | Randall et al. | 127/23 |
| 4,283,297 | 8/1981 | Peters | 252/70 |
| 4,359,528 | 11/1982 | Devos et al. | 435/43 |
| 4,440,792 | 4/1984 | Bradford et al. | 426/271 |
| 4,486,458 | 12/1984 | Bradford et al. | 426/618 |
| 4,585,571 | 4/1986 | Bloom | 106/13 |
| 4,588,512 | 5/1986 | Rippie | 252/70 |
| 4,664,832 | 5/1987 | Sandvig et al. | 252/70 |
| 4,676,918 | 6/1987 | Toth | 252/70 |
| 4,746,449 | 5/1988 | Peel | 252/70 |
| 4,824,588 | 4/1989 | Lin | 252/70 |
| 4,980,282 | 12/1990 | de Troostembergh et al. | 435/43 |
| 5,067,982 | 11/1991 | Caransa et al. | 127/67 |
| 5,135,674 | 8/1992 | Kuhajek | 252/70 |
| 5,302,307 | 4/1994 | Ireland | 252/70 |
| 5,324,442 | 6/1994 | Mathews | 252/70 |
| 5,366,650 | 11/1994 | Wiesenfeld | 252/70 |
| 5,376,292 | 12/1994 | Lucas | 252/70 |

*Primary Examiner*—Anthony Green
*Attorney, Agent, or Firm*—Jack E. Dominik

[57] ABSTRACT

Disclosed is a new and improved, environmentally acceptable and negligibly corrosive deicing composition comprising by-products from a wet milling process of corn, which by-products are biodegradable. The invention also relates to the use of a deicing composition in a manner that helps to reduce the buildup of snow and ice on roads, bridges and other outdoor surfaces.

24 Claims, No Drawings

DEICING COMPOSITION AND METHOD

FIELD OF THE INVENTION

The present invention is directed to an environmentally acceptable and negligibly corrosive deicing composition comprising by-products from a wet milling process of corn, which by-products are biodegradable. The invention also relates to the use of a deicing composition in a manner that helps to reduce the buildup of snow and ice on roads, bridges, runways, taxiways and other outdoor surfaces.

BACKGROUND OF THE INVENTION

It is well known that the ice and snow located on roads and bridges significantly slow traffic and pose increased danger to the general public. Mechanical snow removal is often used to alleviate some of the traffic problems. It is also known that chemical compounds, such as chloride salts, whether in solid form or in solution or in admixture with sand and other substances, are often used to treat the roadways to melt snow and ice. Most deicing compounds, however, are environmentally harmful, and therefore, municipalities are often restricted in the amounts and types of substances that they may use to help control the buildup of snow and ice.

Most chemicals used to treat roadways are detrimental for the following reasons: They damage the soil and surrounding vegetation because the salts turn the soil alkaline and are also absorbed into the root systems of the plants; They damage freshwater streams, rivers and lakes and are often absorbed into underground water systems; and, The salts cause significant damage to vehicles, as well as concrete and metallic structures that are near roadways because of the corrosive effects of said salts. It is well known that many salts cause spalling in concrete structures, which significantly reduce the strength and life of such structures. For the foregoing reasons, many states have banned the use of salts, while others have placed significant restrictions on the usage of salts.

It is known that it is desirable to replace the corrosive salts with non-corrosive substances, such as alcohols and glycols, but because of their flammability, toxicity and expense, these other substances have not been effectively and economically utilized to date.

SUMMARY OF THE INVENTION

The present invention is directed to an environmentally acceptable anti-freeze and deicing composition whose active ingredient is a by-product of a wet milling process of corn, known in the industry as steepwater. The composition is water soluble, negligibly corrosive, inexpensive, and widely-available in large quantities. The present invention is also directed to the use of said deicing composition to help keep roads, bridges, runways taxiways and other outdoor surfaces free of ice and snow.

Generally, substances that are to be used as deicers must have the following characteristics: suitable water solubility; a low freezing temperature in solution; availability on an industrial scale at a low cost; non-corrosiveness; environmentally acceptable; and capable of being applied by generally known and available means.

In view of the foregoing, it is a primary object of the present invention to provide an anti-freeze and deicing composition suitable for making surfaces free of snow and ice, which composition is water soluble, has a low freezing temperature, is cheaply and readily available in large industrial quantities throughout the world, is negligibly corrosive, is environmentally friendly, and is capable of being applied with currently available equipment and by existing crews.

A related object of the present invention is to provide an environmentally friendly, negligibly corrosive deicing composition at a cost-competitive price.

Yet another object of the present invention is to provide an environmentally friendly, negligibly corrosive deicing composition that can be used in admixtures with sand, river gravel, cinders, sawdust, or other skid-reducing, manufactured grit, and subsequently applied to roads, bridges, runways, taxiways and other surfaces where it is desirable to keep said surfaces free of snow and ice.

Another object of the present invention is to provide an environmentally friendly deicing composition that can be used to pretreat roads, bridges and other outdoor surfaces prior to the accumulation of snow and ice to prevent the adherence of snow and ice to said surfaces.

Yet another object of the present invention is to provide an environmentally friendly, negligibly corrosive deicing composition that can be used in admixtures or mixtures with other chemical deicing agents and/or skid-reducing chemical agents and subsequently applied to roads, bridges, runways, taxiways, and other surfaces where it is desirable to keep said surfaces free of snow and ice.

Another object of the present invention is to provide a process for making roads, bridges, runways, taxiways and other outdoor surfaces free of ice and snow, which process comprises applying the deicing composition of the present invention onto such surfaces, either by itself prior to ice or snow, or in mixture or admixture with chemical deicing or other skid-reducing additives.

DESCRIPTION OF A PREFERRED EMBODIMENT

The deicing composition of the present invention is a by-product of a wet milling process of shelled corn. A wet milling process is often employed to obtain staple products such as corn oil, dextrose, corn syrup, high fructose corn syrup, dextrins, dry starches and animal feeds. The principle steps in a wet milling of corn include steeping, milling, recovering and processing. During the steeping process, corn kernels are softened by soaking them in a hot solution containing a very small amount of sulfurous acid. The softened kernels are then separated from the steepwater and further processed depending upon the desired end product. The remaining steepwater contains solubles which, after the steepwater is evaporated and/or dried, are typically recovered for use as nutritional additives in feeds for livestock.

A wet milling process by-product is used as the active substance in the composition of the present invention. Accordingly, the deicing composition of the present invention comprises in an amount of between 14 to 80% by weight of steepwater solubles in admixture with between 20 to 86% by weight of water, which composition may be further admixed with optional additives. As optional additives, the following substances may be used: sand, river gravel, cinders, sawdust and other skid-reducing, manufactured grit, as well as other chemical deicing agents. The compositions of the present invention are excellently suited to serve as anti-freeze and deicing agents for helping to make and/or keep roads, bridges and other surfaces free of snow and ice. Optimally, the deicing composition of the present invention is applied to road surfaces prior to the accumulation of snow and ice, which application will help prevent the snow and ice from adhering to the road surfaces.

Subsequent to the accumulation of snow and ice, the deicing composition of the present invention is again applied, but this time to the accumulated snow and ice. The two-step application will facilitate removal of the accumulated snow and ice by plows and other mechanical methods.

Given that many municipalities typically purchase bulk quantities of chloride salts and other chemical anti-icing agents, it is foreseeable that the composition of the present invention may be mixed or admixed with chloride salts, and possibly calcium magnesium acetate (though the addition of chloride salts, depending on its concentration, may degrade the low corrosiveness and the environmentally friendliness of the present invention). Once they have purchased the large quantities of other chemicals, most municipalities will be inclined to utilize such chemicals even if they must mix only a small amount with the more effective, more acceptable composition of the present invention, though clearly, such a combination is less than optimal from the environmental perspective.

The deicing composition of the present invention also serves as a corrosion inhibiting agent when mixed with corrosive salts. Tests have shown that the corrosive effect of an admixture of the composition of the present invention with a five percent by weight of chloride salts is significantly less than for example, an admixture of 95 percent water and five percent salts. Thus, the composition of the present invention can be effectively mixed with small amounts of salt without significantly affecting the other characteristics of the composition.

According to a further aspect of the present invention, a process for making road surfaces free of snow and ice is provided, said process comprising the application of the composition of the present invention onto the road surfaces prior to icing or snow accumulation. The composition may be preferably applied onto the road surface from moving vehicles in an amount of 20 to 60 gallons per lane mile (GPLM), which is 200 to 600 pounds per lane mile, which is also equivalent to 0.48 to 1.44 ounces per square yard. The composition may also be applied after snow and ice has accumulated in order to melt said snow and ice.

There are no known or identified hazards to humans, animals or the environment from the handling, storing, or using steepwater concentrate. Condensed steepwater is currently used as a low grade animal feed additive or for other low value uses.

The composition of the present invention can also be cost effectively utilized by airports to prevent the accumulation of snow and ice on runways and taxiways. Many airports today use glycols for deicing an airplane's wings and stabilizers, for which the airports must pay sewage treatment processing fees for treatment of the runoff. Such fees can range up to $3.00 per gallon of glycol-contaminated water. Further testing may show that the composition of the present invention can be used to replace the use of glycol for these purposes. The elimination of glycol is better for the environment and avoids the need for processing glycol contaminated water, which process demands the utmost in quality control techniques.

The steepwater concentrate of a wet milling process for corn of the present invention has a typical composition as follows:

| ITEM | DRY BASIS (No Moisture) | CONDENSED (48% solids/52% Moisture) |
|---|---|---|
| Crude Protein | 33.0% | 16.0 |
| Crude Fat | 0.2% | 0.1% |
| Acid Degergent Fiber | 0.66% | 0.32% |
| Phosphorus | 2.31% | 1.12% |
| Calcium | 0.02% | 0.01% |
| Sulfur | 0.56% | 0.27% |
| Potassium | 2.74% | 1.32% |
| Magnesium | 1.08% | 0.52% |
| Sodium | 0.13% | 0.06% |
| Iron | 145 ppm | 70 ppm |
| Aluminum | 22 ppm | 10 ppm |
| Manganese | 34 ppm | 17 ppm |
| Copper | 8 ppm | 4 ppm |
| Zinc | 140 ppm | 68 ppm |
| Total Ash | 27% | 5.4–21.68% |

The main advantages of the composition according to the present invention may be summarized as follows:

1) The composition of the present invention is neither unacceptably corrosive nor environmentally damaging. This is a significant advantage over known compositions which damage vehicles, road ways, and the surrounding environment.

2) The composition of the present invention has a freezing point below 0° F. It is liquid and free flowing at +10° F., and can be easily sprayed and applied to road surfaces or accumulated ice or snow at ambient temperatures. The composition can also be heated before its application.

3) The composition can be applied in comparatively small amounts because once applied to the road surface, the composition of the present invention tends to remain in place and is not easily blown away by the wind or by the action of passing traffic, and the composition tends to prevent the adherence of snow and ice to the surfaces upon which it is applied.

4) The composition can be applied during any prevailing temperature and/or prior to impending snow and ice storms.

5) The composition can easily be applied to the roadways with uniformity using readily available equipment without any special training for the application crews.

6) The composition can be applied in the form of a solution, which allows for quick and even application by vehicles, even at speeds of 35 mph or more.

7) The composition is a low grade, low price industrial by-product available in large quantities in many of the states located in the Snow Belt. Its availability in potential market areas will help keep costs down because the proximity of the solution to the problem areas reduces the transportation costs.

8) The composition is a renewable agricultural by-product and its commercial usage will help support U.S. farmers and the agricultural industry.

9) The composition of the present invention is biodegradable, and yet has a low biological oxygen demand (BOD). The BOD of a substance is a unit-less number that represents the ratio of oxygen utilized (in lbs.) per pound of said substance. The BOD in effect represents the metabolic needs of aerobic microorganisms in organicly rich matter. Most known deicers are not bio-degradable (and hence have a BOD of 0) - - - instead, they accumulate and become poisonous to the environment. One known deicer which is biodegradable is calcium magnesium acetate (CMA), but the present invention has a substantially lower BOD than does CMA.

10) The composition of the present invention can be cost effectively utilized by airports to prevent the accumulation of snow and ice on runways and taxiways, hence eliminating or further reducing the need for other chemical deicers which are known to be environmentally unfriendly.

Summary of Testing

Further details of the present invention are to be found in the following test results without limiting the scope of protection to the specified mixture of composition of the present invention. For the tests, mill run steepwater, concentrated at approximately 50% by weight of dry substance, is applied at an external temperature of 14° F. to a 3.5 inch thick snow sheet of approximately 20 square yards without any additive. For comparison, a readily recognized and available mixture of industrial salts and sand is applied to a second 3.5 inch thick snow sheet of approximately 20 square yards in a nearby location. It was found that the melting effect of the composition having a dry substance content of 50% by weight is superior to that of the mixture of salt and sand, both in duration of effect and the strength of activity. The composition of the present invention having a dry substance content of 50% by weight exhibited a melting effect one hour and a half earlier than the mixture of salt and sand. Moreover, the 50% concentration of the present invention is active even at temperatures as low as 7.5° F, while the melting effect of the salt and sand mixture slows and completely stops at approximately 20° F.

Further testing was done utilizing varying concentration of steepwater, varying between 30% and 60% by weight of dry substance, and at various ambient temperatures. Tests were conducted for anti-icing prior to icing, as well as for deicing subsequent to icing. In all cases the results of the steepwater product were equal to superior to the other known, currently used deicing agents.

Additional testing has been performed to evaluate the composition of the present invention for corrosiveness, biological degradation demands, and efficacy at varying temperatures. The results are discussed below.

Corrosion Tests

Mild steel bolts were immersed in various concentrations of steepwater. After four months of immersion, the bolts showed virtually no evidence of rust or oxidation. Laboratory corrosion tests measured the corrosive effect at 0.53 mils per year (MPY), which is much lower than any other chemical deicing agent and is a small fraction of the corrosiveness of pure water.

Mild steel bolts were sprayed regularly with various concentrations of steepwater. After four months of regular spraying, the bolts showed virtually no evidence of rust or oxidation. Instead of corroding, the bolts appeared to have been sealed by a layer of dried steepwater, which coating appeared to be protective rather than destructive.

The following tables summarizes some of the test results:

| MATERIAL | CORROSION (mils per year - MPY) |
|---|---|
| Mild Steel | 0.50 |
| Stainless Steel | None detectable |
| Aluminum | None detectable |

In comparison, mild steel bolts subjected to similar test conditions as described above, but utilizing mixtures of water and with 5% concentrations of various chloride salts, exhibited extreme corrosion, rust, and deterioration.

Environmental Tests

Tests were performed to measure the biological oxygen demand (in pounds) per pound of various mixtures of the composition of the present invention. Again, the BOD represents the metabolic needs of aerobic microorganisms in organic matter. Results appear below:

| CONCENTRATION (by weight) | BOD DEMAND (lb. of $O_2$ per lb. of material) |
|---|---|
| 25% solids | .13–.15 |
| 48% solids | .21–.26 |

The composition of the present invention is currently used as a low grade animal feed additive. Because it is widely accepted by the livestock industries and is not known to leave deleterious traces of any harmful substances in the animals being fed, it is believed to be completely safe to the environment and safe to handle as well.

Freezing, Deicing, and Anti-Icing Tests

The following results describe the consistency of a mixture of the present invention concentrated at 48% solids:

| TEMPERATURE (°F.) | DESCRIPTION |
|---|---|
| +20 | Free Flowing Liquid |
| +10 | Thin Syrup |
| 0 | Thick Molasses |
| −20 | Thick Putty-like |

The following table summarizes the freezing points and provides more quantitative information on a typical mill run steepwater solution containing approximately 50% solubles:

| SOLUTION CONCENTRATION | | FREEZING TEMPERATURE | VISCOSITY (SSU) | | BOD | pH |
|---|---|---|---|---|---|---|
| (°Brix) | (°Baumé) | (°F.) | (@20° F.) | (@70° F.) | | |
| 50 | 30 | 0 | 475 | 195 | .235 | 4.2 |

"Brix" is the measurement on a hydrometer scale that indicates the relative percentage by weight of a substance in solution. "Baumé" is a measurement on a hydrometer scale that indicates the specific gravity of a substance.

While the melting effect of chloride salts is limited (ineffective below approximately 20° F.), the melting effect of the composition of the present invention, as demonstrated by the tables above, is active even at temperatures as low as 7.5° F.

What is claimed is:

1. An antifreeze and deicing composition for inhibiting the accumulation of snow and ice on outdoor surfaces, which composition comprises from 14 to 80% by weight of steepwater solubles and from 20 to 86% by weight of water, said steepwater solubles being formed using a wet milling process for corn.

2. An antifreeze and deicing composition for inhibiting the accumulation of snow and ice on outdoor surfaces, which composition comprises: a mixture of (1) skid-reducing aggregate, and (2) an admixture of from 14 to 80% by weight of steepwater solubles and from 20 to 86% by weight of water, said steepwater solubles being formed using a wet milling process for corn.

3. The antifreeze and deicing composition of claim 2, wherein the skid-reducing aggregate is comprised of sand.

4. The antifreeze and deicing composition of claim 2, wherein the skid-reducing aggregate is comprised of river gravel.

5. The antifreeze and deicing composition of claim 2, wherein the skid-reducing aggregate is comprised of cinders.

6. The antifreeze and deicing composition of claim 2, wherein the skid-reducing aggregate is comprised of sawdust.

7. The antifreeze and deicing composition of claim 2, wherein the skid-reducing aggregate is comprised of manufactured grit.

8. An antifreeze and deicing composition for inhibiting the accumulation of ice and snow on roadways, which composition comprises: a mixture of (1) at least one component selected from the group consisting of sodium chloride, calcium chloride, potassium chloride, magnesium chloride, calcium magnesium acetate and urea, and (2) an admixture of from 14 to 80% by weight of steepwater solubles and from 20 to 86% by weight of water, said steepwater solubles being formed using a wet milling process for corn.

9. The composition of claim 8, wherein said at least one component is sodium chloride.

10. The composition of claim 8, wherein said at least one component is calcium chloride.

11. A method for inhibiting the accumulation of snow and ice on outdoor surfaces, which method comprises: applying to the outdoor surfaces, or to the snow and ice accumulated thereon, a composition containing from 14 to 80% by weight of steepwater solubles and from 20 to 86% by weight of water, said composition being applied at a rate of from 20 to 60 gallons per lane mile, said steepwater solubles being formed using a wet milling process for corn.

12. The method of claim 11, wherein the composition further contains at least one component selected from the group consisting of sodium chloride, calcium chloride, potassium chloride, magnesium chloride, calcium magnesium acetate and urea.

13. The method of claim 11, wherein the composition further contains a skid-reducing aggregate.

14. The method of claim 13, wherein the skid-reducing aggregate is comprised of sand.

15. The method of claim 13, wherein the skid-reducing aggregate is comprised of river gravel.

16. The method of claim 13, wherein the skid-reducing aggregate is comprised of cinders.

17. The method of claim 13, wherein the skid-reducing aggregate is comprised of sawdust.

18. The method of claim 13, wherein the skid-reducing aggregate is comprised of manufactured grit.

19. A corrosion-inhibiting composition which comprises from 14 to 80% by weight of steepwater solubles and from 20 to 86% by weight of water, said steepwater solubles being formed using a wet milling process for corn.

20. A corrosion-inhibiting composition for inhibiting the corrosive effects of a chloride salt said composition comprising from 14 to 80% by weight of steepwater solubles and from 20 to 86% by weight of water, said steepwater solubles being formed using a wet milling process for corn.

21. The corrosion-inhibiting composition of claim 20, wherein the choride salt is selected from the group consisting of sodium chloride, calcium chloride, potassium chloride, and magnesium chloride.

22. A corrosion-inhibiting composition for inhibiting the corrosive effects of sodium chloride, said composition comprising from 14 to 80% by weight of steepwater solubles and from 20 to 86% by weight of water, said steepwater solubles being formed using a wet milling process for corn.

23. An antifreeze composition for inhibiting the accumulation of snow and ice which comprises from 14 to 80% by weight of steepwater solubles and from 20 to 86% by weight of water, said steepwater solubles being formed using a wet milling process for corn.

24. A deicing composition for inhibiting the accumulation of snow and ice which comprises from 14 to 80% by weight of steepwater solubles and from 20 to 86% by weight of water, said steepwater solubles being formed using a wet milling process for corn.

* * * * *